US012004037B2

United States Patent
McDonald et al.

(10) Patent No.: US 12,004,037 B2
(45) Date of Patent: Jun. 4, 2024

(54) METHOD AND SYSTEM FOR PROVIDING A FALLBACK SOLUTION IN A MULTI-TENANT COMMUNICATION SYSTEM

(71) Applicant: MOTOROLA SOLUTIONS, INC., Chicago, IL (US)

(72) Inventors: Daniel J McDonald, Cary, IL (US); Svend Frandsen, Koege (DK)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 507 days.

(21) Appl. No.: 17/367,823

(22) Filed: Jul. 6, 2021

(65) Prior Publication Data
US 2022/0030494 A1    Jan. 27, 2022

Related U.S. Application Data

(63) Continuation-in-part of application No. 16/668,377, filed on Oct. 30, 2019, now abandoned.

(51) Int. Cl.
*H04W 36/30* (2009.01)
*H04W 4/16* (2009.01)
(Continued)

(52) U.S. Cl.
CPC ........... *H04W 36/305* (2018.08); *H04W 4/16* (2013.01); *H04W 24/04* (2013.01); *H04W 76/18* (2018.02)

(58) Field of Classification Search
CPC ..... H04W 36/305; H04W 4/16; H04W 24/04; H04W 76/18; H04L 69/40
See application file for complete search history.

(56) References Cited

U.S. PATENT DOCUMENTS

| 5,689,810 A | 11/1997 | Shaughnessy et al. |
| 5,724,648 A | 3/1998 | Shaughnessy et al. |

(Continued)

FOREIGN PATENT DOCUMENTS

| EP | 3454531 A1 | 3/2019 |
| WO | 2014178960 A1 | 11/2014 |

(Continued)

OTHER PUBLICATIONS

Centralsquare: "CST OEMS—Uploading 1-6, Files from Citizens", Aug. 13, 15, 2022 Aug. 2020 (Aug. 22, 2020), XP055981909, Retrieved from the Internet: URL:https://screencast-o-matic.com/watch/cYj3nKmoC7#, video cited.

(Continued)

*Primary Examiner* — John D Blanton
(74) *Attorney, Agent, or Firm* — Daniel R. Bestor

(57) ABSTRACT

A method and system for providing a fallback solution in a multi-tenant communication system is provided. A cloud-based call processing service receives a voice call initiation request from a first mobile device located at a first communication system. The voice call initiation request includes a request to complete a voice call with a second mobile device located at a second communication system. Resources are allocated at the first communication system and the second communication system. The cloud-based call processing service establishes a call between the first mobile device and the second mobile device. At some point the first communication system determines that it should fallback to single site operation. In fallback mode, call processing functionality is performed at the first communication system for the first mobile device.

5 Claims, 9 Drawing Sheets

(51) Int. Cl.
*H04W 24/04* (2009.01)
*H04W 76/18* (2018.01)

(56) References Cited

U.S. PATENT DOCUMENTS

| | | | |
|---|---|---|---|
| 8,571,549 B2 | 10/2013 | Peterson et al. | |
| 8,886,182 B2 | 11/2014 | Peterson et al. | |
| 2011/0206013 A1* | 8/2011 | Aramoto | H04W 36/14 370/332 |
| 2011/0294534 A1* | 12/2011 | Gunder | H04W 60/00 455/524 |
| 2013/0111547 A1* | 5/2013 | Kraemer | H04L 63/1433 726/1 |
| 2014/0321444 A1* | 10/2014 | Klein | H04W 76/14 370/338 |
| 2015/0173107 A1* | 6/2015 | Newberg | H04W 76/45 455/416 |
| 2016/0150455 A1* | 5/2016 | Suryavanshi | H04W 36/008375 455/436 |
| 2017/0188206 A1* | 6/2017 | Schmitt | H04W 4/90 |
| 2019/0081886 A1* | 3/2019 | Meyer | H04L 69/40 |
| 2019/0373525 A1* | 12/2019 | Singh | H04W 36/14 |
| 2020/0162762 A1 | 5/2020 | Borsos et al. | |

FOREIGN PATENT DOCUMENTS

| | | |
|---|---|---|
| WO | 2017200529 A1 | 11/2017 |
| WO | 2019021048 A1 | 1/2019 |
| WO | 2021086664 A1 | 5/2021 |

OTHER PUBLICATIONS

Communication Relating To the Results of the Partial International Search, corresponding patent application No. PCT/US2022/035412, filed Jun. 29, 2022, mailed: Oct. 19, 2022, all pages.

* cited by examiner

METHOD AND SYSTEM FOR PROVIDING A FALLBACK SOLUTION IN A MULTI-TENANT COMMUNICATION SYSTEM

BACKGROUND OF THE INVENTION

Coordinating calls between mobile devices located on different communication systems can be complicated. Therefor centralize controllers can be used to provide less complex operation.

However, there are times when continuing to allow the centralized controller to process the call can be disadvantageous. In this case, problems can occur if the centralized processor continues to process calls for the remote communication system.

Therefore a need exists for a method and system for allowing a centralized controller to process calls for a remote communication system without having problems associated with the prior art, such as the situation when the centralized controller is no longer in the best position to process calls for the remote communication system.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
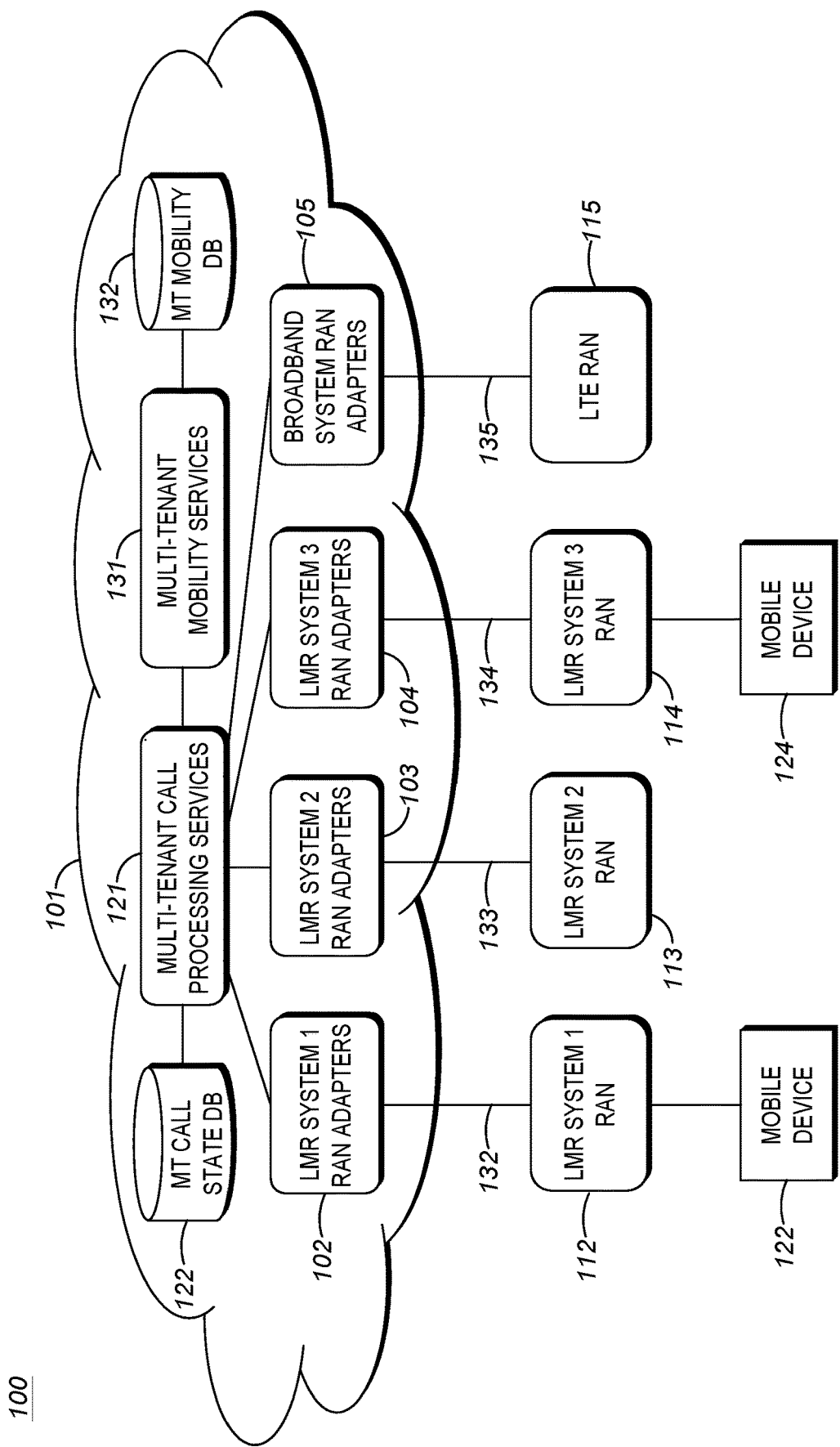
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

FIG. 1 depicts a system diagram of a communication system 100 in accordance with an exemplary embodiment of the present invention. Communication system 100 comprises Call Processing System 101, Land Mobile Radio (LMR) System RAN 112, LMR System RAN 113, LMR System RAN 114, and Long Term Evolution (LTE) System RAN 115. Although only four Radio Frequency (RF) systems (112-115) are shown in FIG. 1 for clarity, it should be understood that communication system 100 could include additional or fewer RF systems. In addition, the type of RF systems within communication system 100 can vary, and can include all RF systems of a single type or any combination of compatible RF systems. Depending on the standard, mobile phones and other wireless connected devices are varyingly known as user equipment (UE), terminal equipment, mobile stations (MS), mobile units, mobile devices, and by other similar names.

A RAN is part of a mobile telecommunication system that implements a radio access technology. In exemplary systems, a RAN resides between a device, such as a mobile phone, a computer, or any remotely controlled machine, and provides connection with a core network, such as Call Processing System 101.

Call Processing System 101 preferably includes LMR System 1 RAN Adapters 102, LMR System 2 RAN Adapters 103, LMR System 3 RAN Adapters 104, Broadband System RAN Adapters 105, Multi-Tenant Call Processing Services 121, Multi-Tenant Call State Database 122, Multi-Tenant Mobility Services 131, and Multi-Tenant Mobility Database 132. In this exemplary embodiment, LMR System 1 RA 102 is operably coupled with LMR System 1 RAN 112 via link 132, LMR System 2 RA 103 is operably coupled with \LMR System 2 RAN 113 via link 133, LMR System 3 RA 104 is operably coupled with LMR System 3 RAN 114 via link 134, and Broadband System RA 105 is operably coupled with LTE RAN 115 via link 135. In an alternate exemplary embodiment, LMR System 1 RA 102 resides in LMR System 1 RAN 112, LMR System 2 RA 103 resides in LMR System 2 RAN 113, LMR System 3 RA 104 resides in LMR System 3 RAN 114, and Broadband System RA 105 resides in LTE RAN 115.

In accordance with an exemplary embodiment, Call Processing System 101 provides cloud-based call processing for multi-system, multi-tenant, multi-technology calls. Call Processing System 101 also preferably provides a fallback solution should a RAN either not desire or not be able to complete calls using Call Processing System 101. In this scenario, a RAN, such as LMR System 1 RAN 112, includes call processing and resource management functionality so that calls can be processed in standalone, fallback mode. The fallback solution provides a flexible system that can result in a single system, single tenant voice call processing service. In this exemplary embodiment, the fallback solution preferably provides a solution that results in a single system, single tenant access permission database that is kept up to date in real time from the multi-system, multi-tenant database, Multi-Tenant Mobility Database 132.

Call Processing System 101 includes a RAN Adaptation Layer, which is preferably comprised of a plurality of RAN Adapters, such as LMR System RAN Adapters 102, LMR System RAN Adapters 103, LMR System RAN Adapters 104, and Broadband System RAN Adapters 105. The RAN Adapters enable a common call processing solution yet still support different technologies, including LMR and Broadband technologies. In an exemplary embodiment, the RAN Adaptation Layer comprises one RAN Adapter per edge component (for example a RAN Adapter per RF or Console site), termination of the layer 2 message delivery protocol (for example a Transport Layer Security (TLS) link to the sites), conversion of technology specific messages to generic services messages, allocation of RAN specific resources (for example allocating RF channels for LMR sites or console bandwidth for console sites done on a per-RAN Adapter level), and RAN component functionality that is considered unique to the specific service rules associated with a RAN (for example resending call grants to an LMR site when a communication device registers at a site).

In accordance with FIG. 1, LMR System RAN Adapters 102 is coupled to LMR System RAN 112, LMR System RAN Adapters 103 is coupled to LMR System RAN 113, LMR System RAN Adapters 104 is coupled to LMR System RAN 114, and Broadband System RAN Adapters 105 is coupled to LTE System RAN 115.

Figure 2:
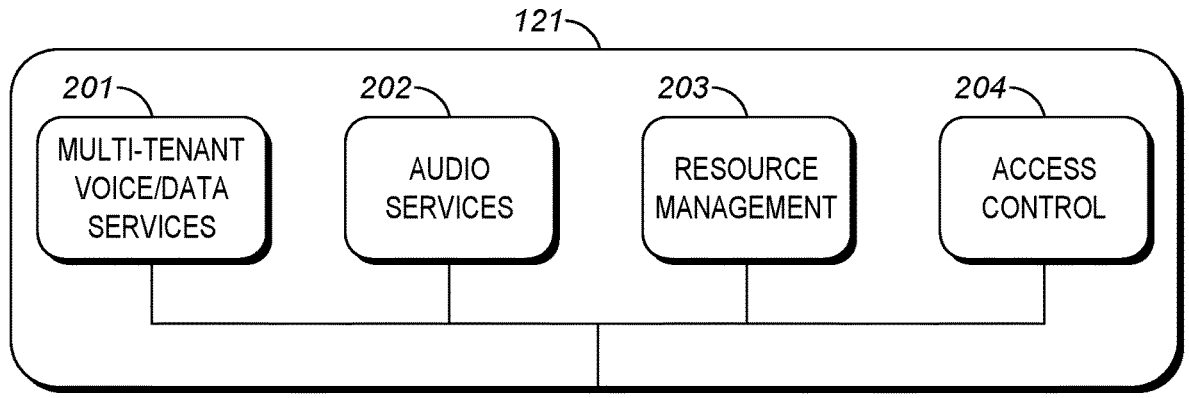
FIG. 2 depicts a multi-tenant call processing services function in accordance with an exemplary embodiment of the present invention.

Multi-Tenant Call Processing Services 121 provides multi-tenant, multi-system, and multi-technology voice call processing service and is depicted in more detail in FIG. 2. In accordance with an exemplary embodiment, Multi-Tenant Call Processing Services 121 is a cloud-based solution that supports multi-tenant voice call processing services and controls at least one access permission database and at least one mobility database, such as Multi-Tenant Mobility Database 132. Multi-Tenant Call Processing Services 121 preferably controls and maintains Multi-Tenant Call State Database 122, for example by writing and reading call information from and to Multi-Tenant Call State Database 122.

Multi-Tenant Call State Database 122 stores the current active call state for every call being processed by Call Processing System 101. the state of the call for active calls, the current audio source of the call, and the priority of the current audio source of the call. The state of the call can be, for example, active voice, hangtime, or call teardown. The current audio source of the call can be, for example, a radio or a console.

Multi-Tenant Mobility Services 131 supports the services necessary to enable radio or console access to the system. In an exemplary embodiment, Multi-Tenant Mobility Services 131 includes the functions of authentication, radio registration, radio affiliation, radio deregistration, console in service, console affiliation, console association, and console out of service. Since the mobility services update and maintain the mobility data associated with these services, access to information in Multi-Tenant Mobility Database 132 preferably flows through Multi-Tenant Mobility Services 131. Therefore, user services, such as group call, preferably access the mobility information via mobility services microservices.

Multi-Tenant Mobility Database 132 preferably stores mobility information for mobile stations and console terminals. In accordance with an exemplary embodiment, Multi-Tenant Mobility Database 132 stores the mobile station (MS) registration state, the MS talkgroup affiliation, the MS site location, the console registration state, and console affiliated talkgroup information. Multi-Tenant Mobility Database 132 can be, for example, an integrated Home Location Register (iHLR), a Gateway HLR (GHLR), a Visitor Location Register (VLR), or a combination of one or more of the above.

In the exemplary embodiment depicted in FIG. 1, LMR System RAN 112 is an ASTRO digital two-way radio communications network that is designed specifically for law enforcement, fire and medical services to communicate with each other during emergency situations. LMR System RAN 112 is a mission critical voice and data communication RAN and can operate in the 700 MHz, 800 MHz, 900 MHz, UHF and VHF bands for voice and data operation.

In an exemplary embodiment, each of the RANs 112-115 include multiple sites, each site equipped with a plurality of base stations. Each RAN 112-115 also preferably includes software and hardware to allow for fallback operation, which occurs when a RAN desires to operate apart from Call Processing System 101.

In the exemplary embodiment depicted in FIG. 1, LMR System RAN 113 is also an ASTRO digital two-way radio communications network. In this exemplary embodiment, LMR System RAN 113 has a different Wide Area Communications Network (WACN)/System ID information than LMR System RAN 112.

In the exemplary embodiment depicted in FIG. 1, LMR System RAN 114 is a MotoTRBO LMR system that preferably operates in multi-system, cloud-based mode. When the connection between LMR System RAN 114 and Multi-Tenant Call Processing Services 121 goes down, LMR System RAN 114 can fallback to single site operation. This same functionality of falling back to single site operation preferably exists for all RANs in FIG. 1, for example (LMR System RAN 112, LMR System RAN 113, and LTE System RAN 115.

In an exemplary embodiment depicted in FIG. 1, LTE System RAN 115 is an LTE RAN that provides broadband access and services to subscribers.

FIG. 2 depicts multi-tenant call processing services function 121 in additional detail in accordance with an exemplary embodiment of the present invention.

Multi-Tenant Call Processing Services 121 comprises Multi-Tenant Voice/Data Services Processor 201, Audio Services Processor 202, Resource Management Processor 203, and Access Control Processor 204.

Multi-Tenant Voice/Data Services Processor 201 performs the processing of voice calls and data services for mobile devices utilizing Multi-Tenant Call Processing Services 121. In accordance with an exemplary embodiment, the mobile devices utilizing Multi-Tenant Voice/Data Services Processor 201 can be of any technology that is connected to Multi-Tenant Voice/Data Services Processor 201 via the RAN Adaptation layer, which includes RAN Adapters 102-105. Multi-Tenant Voice/Data Services Processor 201 stores and retrieves data in Multi-Tenant Call State Database 122.

Audio Services Processor 202 performs audio functions necessary to support Multi-Tenant Voice/Data Services Processor 201. Audio Services Processor 202, for example, performs the functions of vocoding, devocoding, transcoding, encryption, and decryption. Audio Services Processor 202 may also perform audio routing services, for example, duplication of audio packets and routing to target RAN endpoints, such as RF Sites.

Resource Management Processor 203 provides integrated resource management for multiple systems and multiple technologies. In an exemplary embodiment, Resource Management Processor 203 provides overall call resource management based on a call state determined by each technology. In addition, Resource Management Processor 203 preferably determines the overall call state, such as grant, busy, or reject.

In the exemplary embodiment depicted herein, Resource Management Processor 203 interacts with the resource management processors within the RANs connected to call processing system 101. For example, Resource Management Processor 203 obtains channel/slot resources for each Astro RAN, such as RAN 112 and RAN 113 in FIG. 1. Each RAN preferably includes multiple sites and consoles, and preferably uses ASTRO resource allocation rules. Resource Management Processor 203 preferably obtains slot resources for MOTOTRBO RAN 114 that includes a talkgroup member, preferably using MOTOTRBO resource allocation rules. Similarly, Resource Management Processor 203 preferably uses an Rx interface to obtain bearers per radio for critical users when interfacing with LTE RAN 115, preferably using LTE resource management rules. In accordance with an exemplary embodiment, Resource Management Processor 203 obtains resources from an associated RA.

Access Control Processor 204 isolates data needed for a service to only those needing access. By protecting shared data, privacy is enhanced. Access Control Processor 204 preferably controls access of a calling party and a called party based upon whether the calling party and the called party are allowed to perform a service requested and also whether the calling party and the called party are allowed to perform the requested service at the sites where the service was requested. Access Control Processor 204 also controls access for group calls, such as talkgroup calls, preferably by accessing subscriber access control (SAC) database and retrieving SAC records for each mobile device participating in the call. For talkgroup calls, this includes verifying access to the requested service and whether the requested service is allowed at the site.

Figure 3:
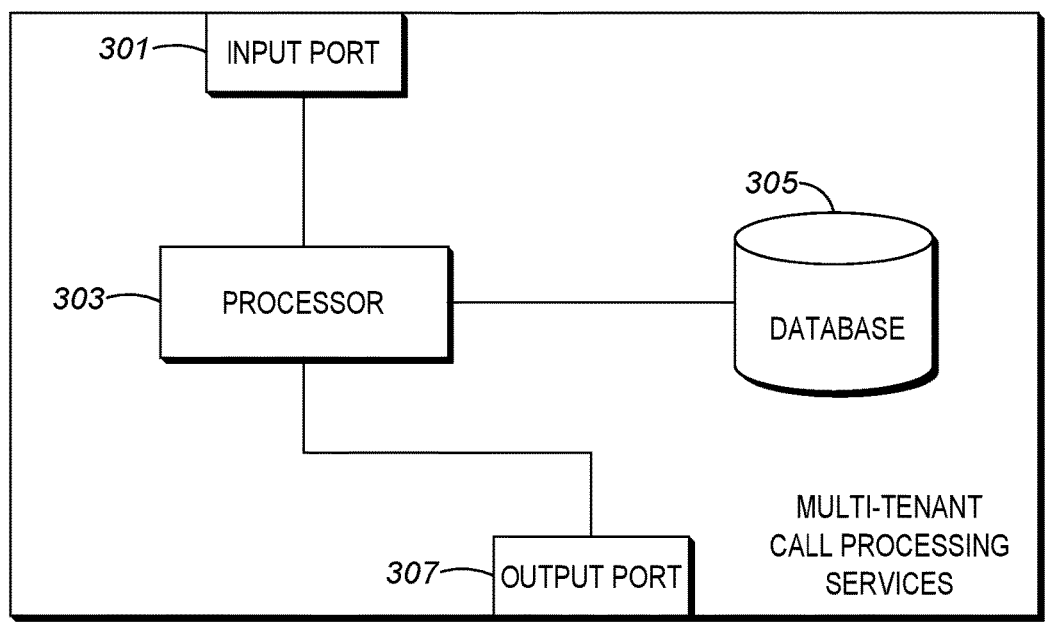
FIG. 3 depicts a schematic diagram of a multi-tenant call processing services function in accordance with an exemplary embodiment of the present invention.

FIG. 3 depicts a schematic diagram of LMR System RAN Adapter 102 in accordance with an exemplary embodiment of the present invention. In the exemplary embodiment depicted in FIG. 3, LMR System RAN Adapter 102 includes an input port 301, a processor 303, a database 305, and an output port 307. Input port 301 and processor 303 communicate over one or more communication lines or buses, as do processor 303 and output port 307. Wireless connections or a combination of wired and wireless connections are also possible.

Input port 301 receives electronic signals and messages from LMR System RAN 112, Multi-Tenant Call Processing Services 121, and Multi-Tenant Mobility Services 131. Output port 307 transmits signals and messages to LMR System RAN 112, Multi-Tenant Call Processing Services 121, and Multi-Tenant Mobility Services 131. As described above, each of these RAN Adapters transmits and receives signals and messages from associated RANs. Input port 301 and output port 307 are electrically connected to processor 303. Although depicted in FIG. 3 as two separate elements, input port 301 and output port 307 can be a single element.

Processor 303 may include a microprocessor, application-specific integrated circuit (ASIC), field-programmable gate array, or another suitable electronic device. Processor 303 obtains and provides information (for example, from database 305 and/or input port 301), and processes the information by executing one or more software instructions or modules, capable of being stored, for example, in a random access memory ("RAM") area of database 305 or a read only memory ("ROM") of database 305 or another non-transitory computer readable medium, such as Multi-Tenant Call State Database 122. The software can include firmware, one or more applications, program data, filters, rules, one or more program modules, and other executable instructions. Processor 303 is configured to retrieve from database 305 and execute, among other things, software related to the control processes and methods described herein.

Database 305 can include one or more non-transitory computer-readable media, and may include a program storage area and a data storage area. The program storage area and the data storage area can include combinations of different types of memory, as described herein. In the embodiment illustrated, database 305 stores, among other things, instructions for processor 303 to carry out the method of FIG. 4.

Figure 4:
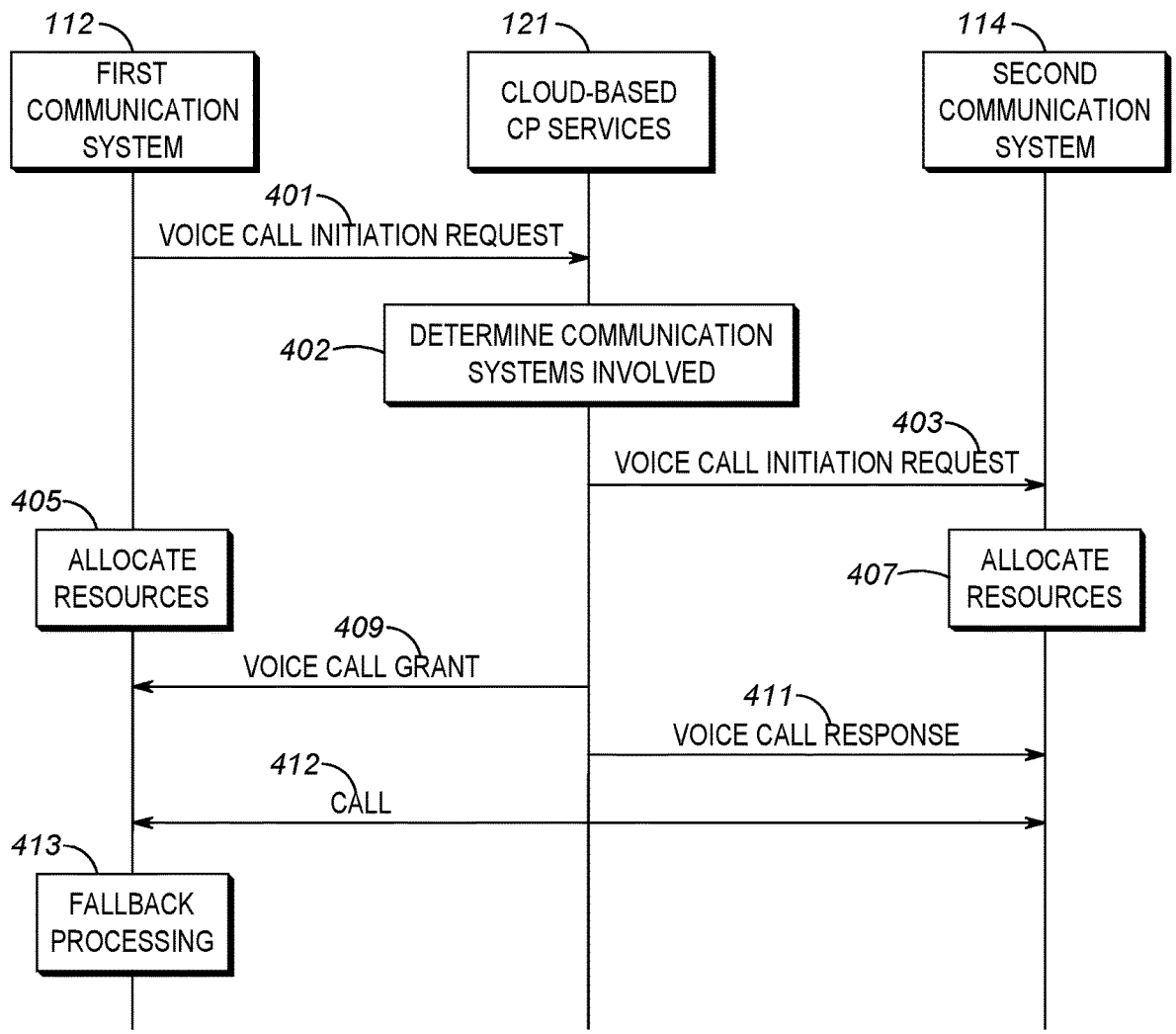
FIG. 4 depicts a call flow diagram in accordance with an exemplary embodiment of the present invention.

FIG. 4 depicts a call flow diagram 400 of a method for providing a fallback solution in a multi-tenant communication system in accordance with an exemplary embodiment of the present invention. In accordance with the exemplary embodiment depicted in FIG. 4, a First Communication System located at LMR System RAN 112 and a Second Communication System located at LMR System RAN 114 are distinct from each other. It should also be understood that this invention works for two communication systems that are utilizing the same over the air (OTA) protocol, such as LMR ASTRO, LMR MotoTRBO, or LTE, or whether the two OTA protocols are different. This is facilitated at least in part because the mobility management functionality is being performed at Cloud-Based Multimedia Services 131, which is capable of managing mobile devices for multiple technologies, from multiple systems, and for multiple tenants.

In accordance with an exemplary embodiment, First Mobile Device 122 located at a First Communication System within LMR System RAN 112 sends a Voice Call Initiation Request message 401 to Cloud-Based Call Processing Services 121. Voice Call Initiation Request message 401 is preferably sent to Cloud-Based Multimedia Services 131 via LMR System 1 RA 102, and preferably traverses Multi-Tenant Call Processing Services 121. Alternately, First Mobility Update Request message 401 is routed to LMR System 1 RA 102 and then directly to Cloud-Based Multimedia Services 131. In accordance with an exemplary embodiment, Voice Call Initiation Request message 401 is a request to initiate a call with Second Mobile Device 124. In an exemplary embodiment, this call is a group call, such as a talkgroup call. In accordance with an exemplary embodiment, Voice Call Initiation Request 401 comprises a request to complete a group voice call with Second Mobile Device 124 located at Second Communication System 114. The group voice call can be, for example, a talkgroup call. Voice Call Initiation Request 401 preferably includes the RAN-specific access parameters and call initiation information for First Mobile Device 122 and Second Mobile Device 124. In the exemplary embodiment where the call is a talkgroup call, talkgroup parameters are included in Call Initiation Request message 405.

Upon receiving First Mobility Update Request message, Cloud-Based CP Services 121 determines (402) the communication systems that are involved in the call initiation request. In a direct call, First Communication System 112 and Second Communication System 114 are the two communication systems involved in the call. In the exemplary embodiment where the call is a group call, such as a talkgroup call, the communication systems that are involved in the call are all communication systems that have a group member located at their system.

Cloud-Based Call Processing Services 121 sends Voice Call Initiation Request 403 to Second Communication System 114. Voice Call Initiation Request 403 alerts Second Communication System 114 of the call initiation request and requests resource allocation at Second Communication System 114.

Since the initiator of the voice call initiation request originated from First Mobile Device 122 located at First Communication System 112, First Communication System 112 allocates (405) resources at First Communication System 112. In accordance with an exemplary embodiment, LMR System RA 102 determines the resources necessary for the call. These resources can include, for example, base stations and other system resources.

In this exemplary embodiment, since Second Mobile Device 124 is located at Second Communication System 114, Second Communication System 114 allocates (407) resources to facilitate the voice call. These resources can include, for example, base stations and other system resources.

Cloud-Based Call Processing Services 121 issues Voice Call Grant message 409 to First Communication System 112, which passes on the call grant to the initiating First Mobile Device 122 located at First Communication System 112.

Cloud-Based Call Processing Services 121 issues Voice Call Response message 411 to Second Communication System 114, which passes on the call grant to the receiving Second Mobile Device 124 located at Second Communication System 114. In accordance with an exemplary embodiment, the voice call setup is now complete and the voice call can commence.

Call 412 commences between First Mobile Device 122 and Second Mobile Device 124.

At some point, First Communication System 112 performs (413) fallback processing. In Fallback Processing, First Communication System 112 determines that utilizing Cloud-Based CP Services 121 is no longer possible or desired. In a first exemplary embodiment, this occurs when any links between First Communication System 112 and Cloud-Based CP Services 121 goes down or becomes inoperable. In a further exemplary embodiment, this occurs when operators of First Communication System 112 determine that they prefer to operate as a in fallback mode.

If fallback processing occurs during a call, Cloud-Based Call Processing Services 121 no longer performs call control for call 412. Instead, the call is now processed by First Communication System 112. The call is now single tenant. In accordance with an exemplary embodiment, Cloud-Based Call Processing Services 121 shares access control parameters and mobility management information with First Communication system 112 for mobile devices that are associated with First Communication system 112.

This preferably happens until First Communication System 112 desires to once again use Cloud-Based Call Processing Services 121, at which time the call processing responsibility would return to Cloud-Based Call Processing Services 121, and a call is then handled as described above up until step 413.

Figure 5:
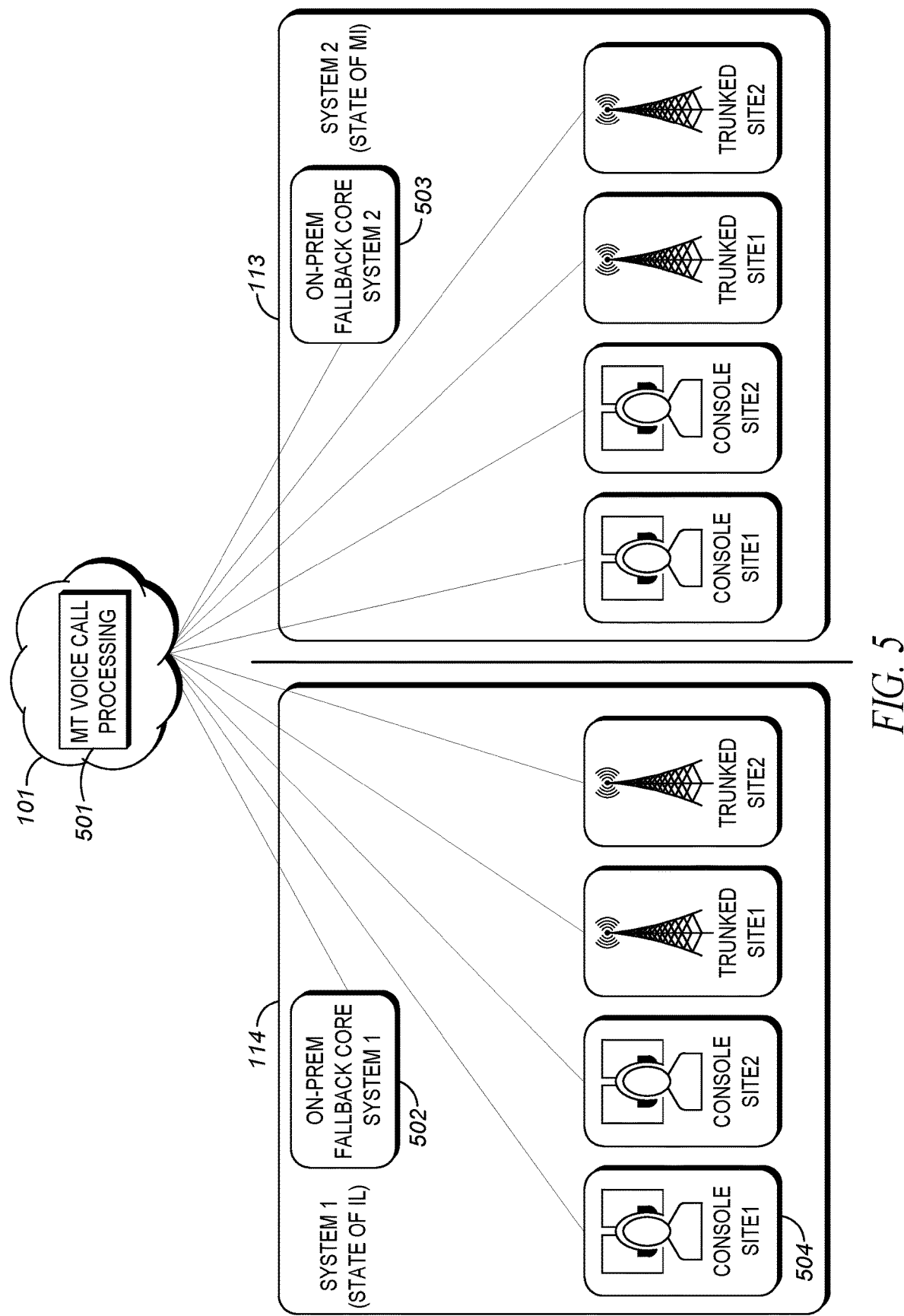
FIG. 5 is a more-detailed view of a radio access network.

As discussed above, the system shown in FIG. 1 provides a fallback from multi-tenant to single tenant communications when communication links between any RAN and cloud-based call processing system 101 fail. This is further illustrated in FIG. 5 through FIG. 8. As shown in FIG. 5, cloud-based call processing system 101 includes multi-tenant call processing circuitry 501. Multi-tenant call processing circuitry 501 preferably comprises those elements shown in FIG. 1, namely LMR System 1 RAN Adapters 102, LMR System 2 RAN Adapters 103, LMR System 3 RAN Adapters 104, Broadband System RAN Adapters 105, Multi-Tenant Call Processing Services 121, Multi-Tenant Call State Database 122, Multi-Tenant Mobility Services 131, and Multi-Tenant Mobility Database 132.

For simplicity, in FIG. 5 through FIG. 8, only RAN 113 and RAN 114 are shown interfacing with cloud-based call processing system 101. RAN 113 and RAN 114 each comprise a local (on premise) fallback core 502 and 503, respectively. These fallback cores 502 and 503 provide all necessary call processing functionality to provide calls between radio-frequency (RF) sites 504 existing only within each RAN. More specifically, RF sites 504 (only one labeled in FIG. 5) may comprise elements such as base stations, LMR base stations, both trunking and conventional, LTE base stations (EnodeB) wifi access points, control consoles, radios, smart devices, . . . , etc. that communicate with each other. When RF sites are linked to cloud-based call processing system 101, the RF sites are capable of communicating between RANs, so, for example, a trunked site (e.g., a base station) in RAN 114 may communicate with another trunked site 504 existing within RAN 113. These RANS may be separated by hundreds of miles geographically, so for example RAN 114 may exist in the state of Illinois, while RAN 113 may exist in the state of Michigan.

When a RAN cannot communicate with cloud-based call processing system 101, the local on premise fallback cores 502 and 503 will serve to provide call-processing functionality for all RF sites within the RAN. However, the functionality provided by these fallback cores 502 and 503 will only provide communications between RF sites existing within the RAN. So, for example, fallback core 502 will only provide call services between RF sites 504 existing within RAN 114. No communications between RF sites within other RANs will be available.

Figure 6:
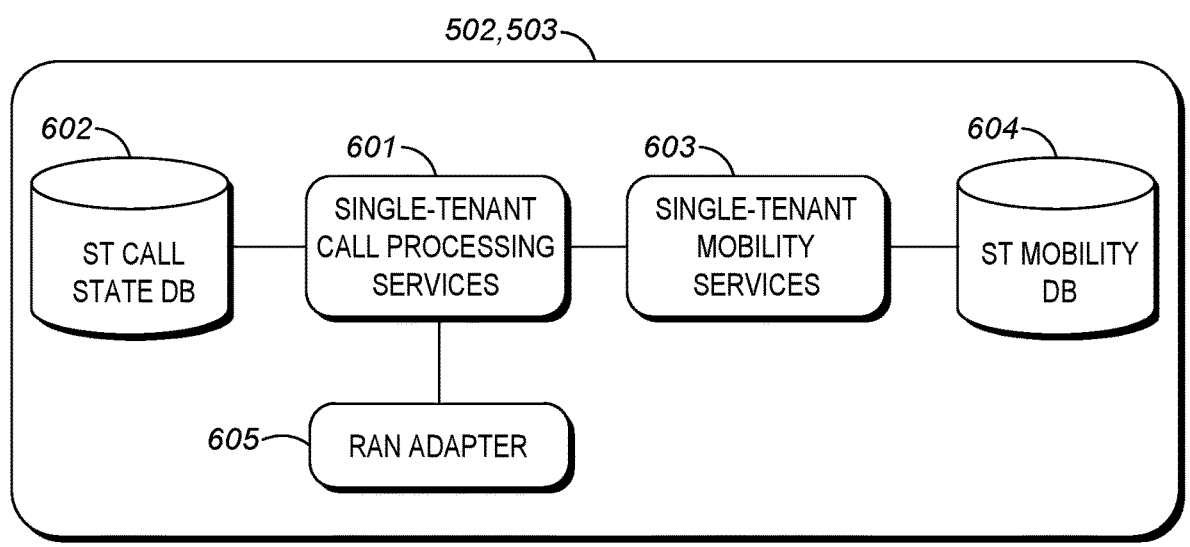
FIG. 6 is a block diagram of a RAN fallback core.

As shown in FIG. 6, in order to provide intra-RAN communications between RF sites, fallback cores 502 and 503 comprise their specific RAN adapter 605 along with Single-Tenant Call Processing Services 601, Single-Tenant Call State Database 602, Single-Tenant Mobility Services 603, and Single-Tenant Mobility Database 604. These elements are similar to those shown in FIG. 1 (for multi-tenant communications), however, these software components only supports calls within the specific RAN/system and do not support calls between RANs/systems. Also, the databases only contains information specific to radios/sites in that RAN/system as described below.

In order to provide a fallback solution from multi-tenant to single tenant communications, the databases within system 101 will need to be replicated in fallback cores 502 and 503. More specifically, multitenant call state database 122 and multi-tenant mobility database 132 will need to be replicated within single-tenant call state database 602 and single tenant mobility database 604, respectively. However, it is not desirable from a security standpoint to replicate the entire databases 122 and 132 within databases 602 and 604 since all communications will be intra-RAN communications. More specifically, since all communications among RANs operating in a fallback mode will be intra-RAN communications, only information on call states within the RAN will be needed. There is no need for one RAN to know about the call states of another RAN, when communications between RANs in a fallback state do not exist. With the above in mind, logic circuitry will exist within each database 122 and 132 (not shown in FIG. 1) that will replicate only a portion of their databases to each RAN. The portion of the database replicated for any particular RAN will include information on calls and devices that exist only within a RAN.

With the above in mind, on-premise fallback cores 502 and 503 provide a fallback solution in a multi-tenant communication system. During operation a first radio-access network (RAN) and a second RAN may be within communication with each other through a cloud-based call-processing service. When this happens, a first database is established within the cloud-based call-processing service, wherein the first database comprises radio and talkgroup configuration and call activity information. A first portion of the first database is then replicated at a second database within the first RAN 113, wherein the first portion of the first database comprises radio and talkgroup configuration and call activity information for only radios and talkgroups associated with the first RAN. Thus, databases 602 and 604 are replicated data from databases 122 and 132, respectively.

In a similar manner, a second portion of the first database is replicated at a third database within the second RAN 114, wherein the second portion of the first database comprises radio and talkgroup configuration and call activity information for only radios and talkgroups associated with the second RAN. As discussed, the first database is utilized for call processing between a first RF site in the first RAN and a second RF site in the second RAN during a cloud-based communication between the first RAN and the second RAN. The second database is utilized for call processing between RF sites that exist only in the first RAN, and is utilized for communication among RF sites within the first RAN when communication between the first RAN and the cloud-based call-processing service fails. Finally, the third database is utilized for call processing between RF sites that exist only in the second RAN, and is utilized for communication among RF sites within the second RAN when communication between the second RAN and the cloud-based call-processing service fails.

The radio and talkgroup configuration and call activity information comprises information from the group consisting of radio registration information, radio association to a selected talkgroup, radio site location, talkgroup site location, what calls are currently active, and what talkgroups are currently active, which RF sites are in a call, which RF channels are active in the call, which radio is currently transmitting audio for the call.

Figure 7:
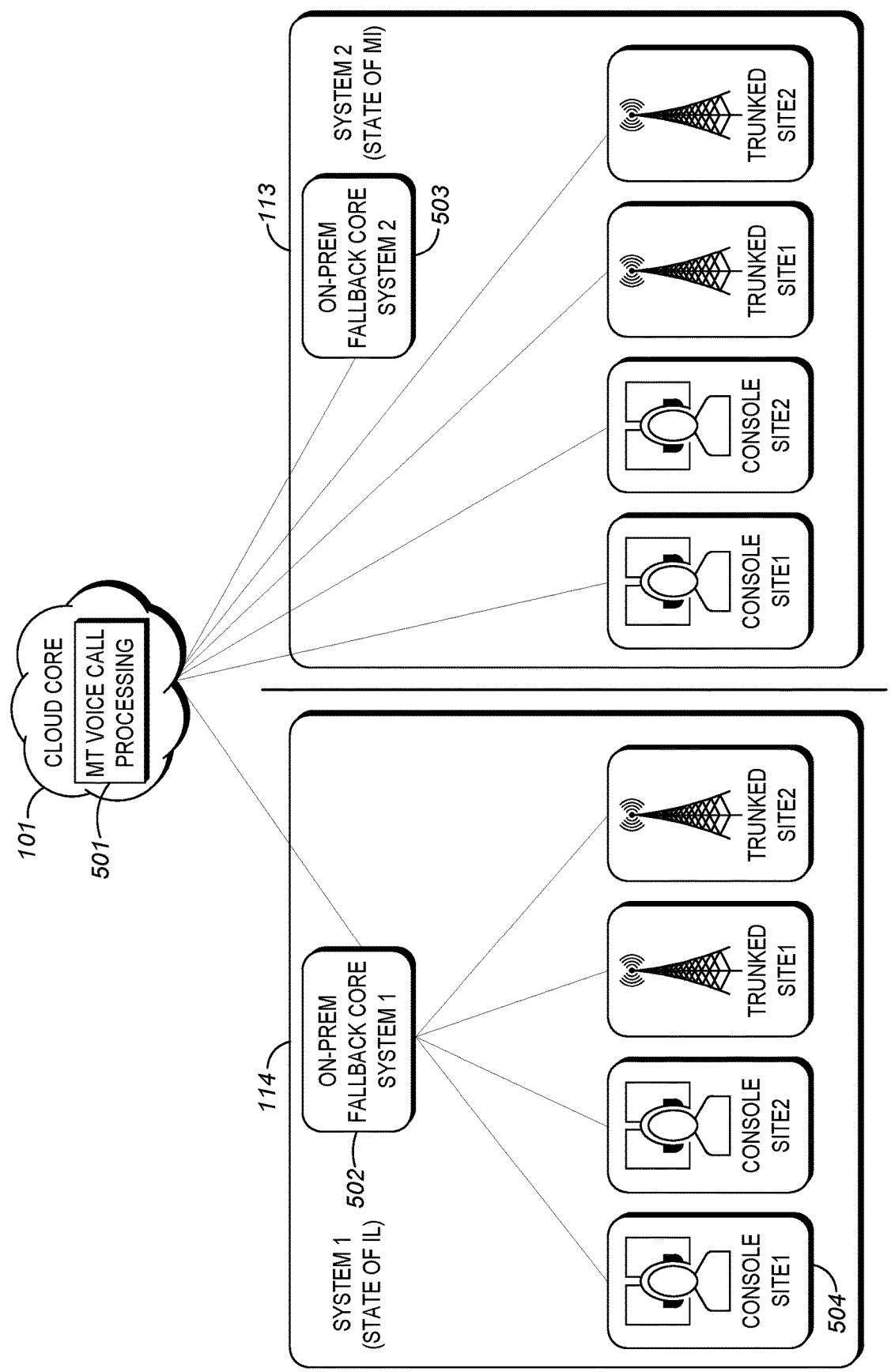
FIG. 7 illustrates fallback from a cloud-based system to a local-based system.

FIG. 7 illustrates a fallback solution to single-tenant communications for RAN 114. This fallback solution may have been triggered by a break in communications between any RF site in RAN 114 with cloud-based call-processing system 101. Thus, in this scenario, if any RF site existing within a RAN breaks communications with system 101, a fallback solution will be enforced on all RF sites 504 existing within the RAN. Thus, the fallback cores 502 and 503 will instruct all RF sites 504 under them to fallback to a single-tenant solution. Thus, in FIG. 7, at least one RF site 504 within RAN 114 has lost communications with system 101, forcing core 502 to instruct all RF sites 504 to cease communicating with system 101 and route communications through core 502. A trigger is sent from any RF site to core 502 when communications with cloud-based call processing system 101 fails.

In the above scenario (FIG. 7), a radio-access network (RAN) is provided having a first RF site in communication with a second RF site at a second RAN through a first link established through a cloud-based call-processing service. A RAN is provided comprising a fallback core comprising a single tenant call processing service 601 configured to determine that a second link through the cloud-based call-processing service has failed, wherein the second link established communication between a third RF site on the first RAN and a fourth RF site on the second RAN, implement a fallback mode of communication for the first RAN, in response to the second link going down, wherein the fallback mode of communication allows communication between RF sites existing only at the first communication system, and in response to the implementation of the fallback mode of communication, drop the first link through the cloud-based call-processing service.

Figure 8:
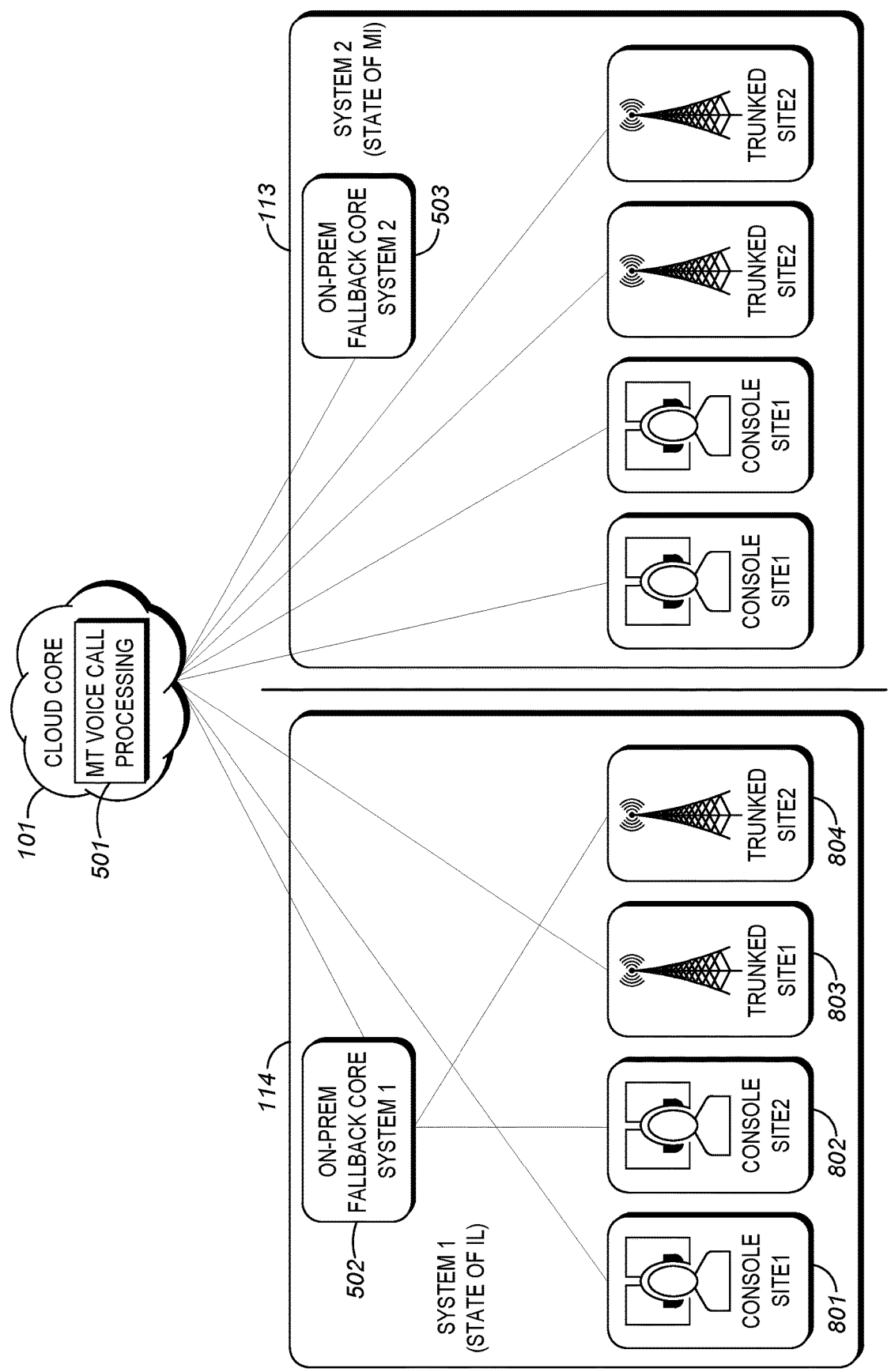
FIG. 8 illustrates fallback from a cloud-based system to a local-based system.

In an alternate embodiment of the present invention, only those RF sites that lose communications with system 101 will route communications through the fallback core. Thus, as shown in FIG. 8, two RF sites (802 and 804) have lost communications with system 101 and have fallen back to routing communications through core 502. However, RF sites 801 and 803 remain in communication with system 101. Because of this, RF sites 802 and 804 will only be able to communicate with each other. More particularly, since RF sites 802 and 804 have fallen back to a single-tenant solution, they will only be able to communicate inter RAN with those sites that have fallen back to a single-tenant solution.

As is evident, this solution may be sub-optimal, since RF sites within a RAN may not be able to communicate with each other if only a subset of RF sites have fallen back to a single-tenant solution. Because of this, in another embodiment, all RF sites will be forced to fallback to a single-tenant solution when a predetermined number of RF sites have lost communication with system 100. Thus, for example, when 40% of the RF sites under a RAN have lost communications with system 101, all RF sites will be forced to a single-tenant solution (i.e., all RF sites will be forced to communicate with the fallback core and cease communications with system 101).

In yet another embodiment of the present invention, the determination on what sites to force a fallback solution on may be based on call statistics between sites. For example, if RF site 804 has very little historical communications with RF site 801, then it may not be desirable to have RF site 801 fallback to a single tenant solution if RF site 804 does, and vice versa. Additionally, sites may fallback together (i.e., if one fails) based on the geographical location of each site. For example, if site 804 falls back to the on-prem core, it may be advantageous to have all sites adjacent to 804 also fallback to the on-prem core to allow for users in a common jurisdiction (e.g. cook county) to communicate with each other. This could be determined based on physical location (e.g. the sites are adjacent in coverage with each other) or via a pre-configured association (e.g. all sites in cook county, even if they are all not adjacent to each other).

When the scenario of FIG. 8 is realized, a RAN is provided supporting communication between a first RF site at the RAN and a second RF site at a second RAN through a first link existing through a cloud-based call-processing service. A fallback core is provided that is configured to determine that a second link through the cloud-based call-processing service has failed, wherein the second link established communication between a third RF site at the RAN and a fourth RF site on the second RAN, and implement a fallback mode of communication for the third RF site, in response to the second link going down. The fallback mode of communication drops communication between the third RF site and the cloud-based call-processing service, establishes communication between the third RF site and a local call-processing service, allows communication between the third RF site and other RF sites existing only at the first RAN through the local call-processing service, and allows the first RF site to communicate through the cloud-based call-processing service.

The fallback core may be further configured to determine that a fifth RF site is within a same jurisdiction or county as the third RF site and implement a fallback mode of communication for the fifth RF site, in response to the second link going down based on the fact that the fifth RF site is within the same jurisdiction or county as the third RF site.

The fallback core may be further configured to determine a history of communication between a fifth RF site and the third RF site and implement a fallback mode of communication for the fifth RF site, in response to the history of communication between the fifth RF site and the third RF site. In this scenario, the fallback core will keep history data in one of the provided databases.

The fallback core may be further configured to determine that a predetermined number of links from the first RAN to the cloud-based call-processing service have failed. When a predetermined number of links have failed then the fallback mode of communication will drop all communication between the all RF sites within the first RAN and the cloud-based call-processing service, establish communication between all RF site within the first RAN and a local call-processing service, and allow communication between all RF sites within the first RAN through the local call-processing service.

The fallback core may be further configured to determine that a fifth RF site is adjacent to the third RF site and implement a fallback mode of communication for the fifth RF site, in solely in response to the second link going down based on a fact that the fifth RF site is adjacent to the third RF site.

The fallback core may be further configured to determine that a fifth RF site is configure to fallback with the third RF site and implement a fallback mode of communication for the fifth RF site in response to the second link going down based on a fact that the fifth RF site is configured to fallback with the third RF site.

Figure 9:
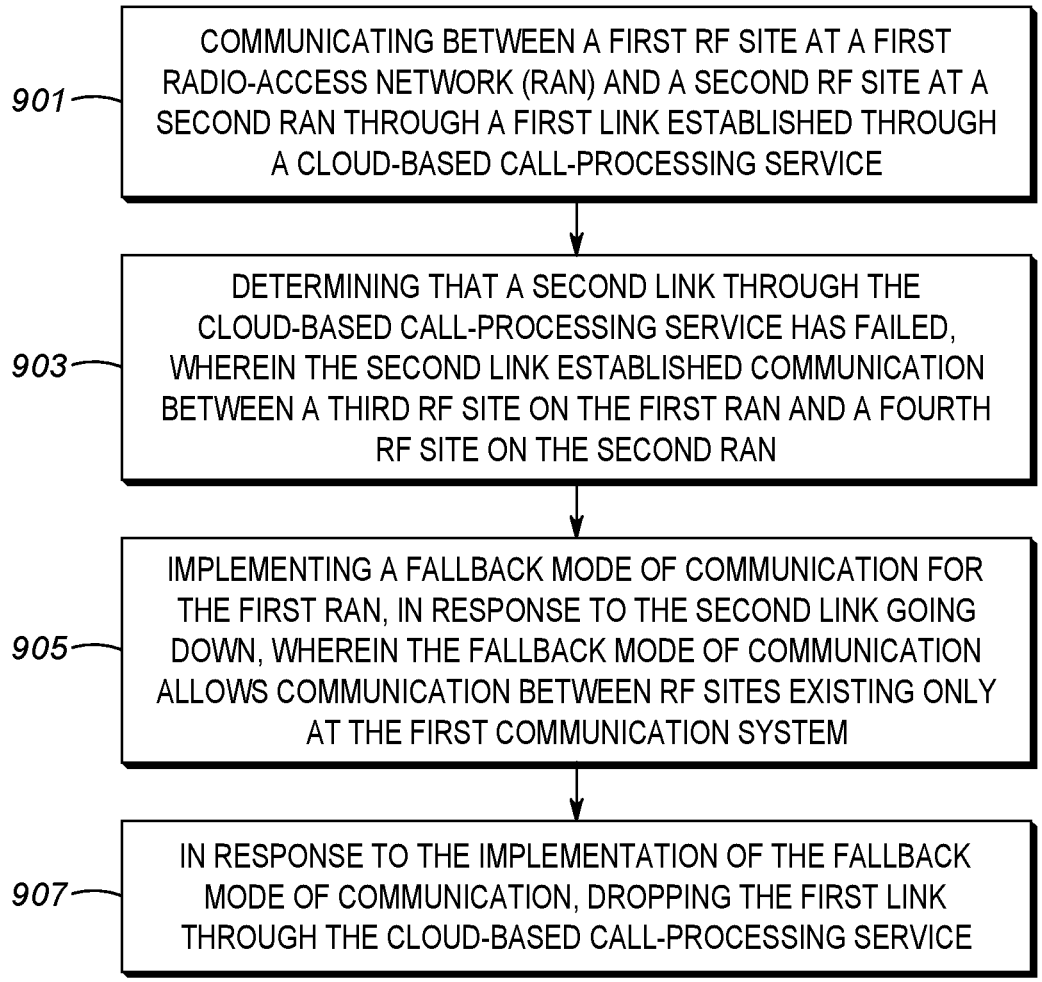
FIG. 9 is a flow chart showing operation of a RAN.

FIG. 9 is a flow chart showing operation of a RAN. The logic flow begins at step 901 where a first RF site at a first radio-access network (RAN) is communicating with and a second RF site at a second RAN through a first link established through a cloud-based call-processing service. At step 903 a determination is made by the fallback core (i.e., Single-tenant call Processing services 601) that a second link through the cloud-based call-processing service has failed, wherein the second link established communication between a third RF site on the first RAN and a fourth RF site on the second RAN. At step 905, the fallback core then implements a fallback mode of communication for the first RAN, in response to the second link going down, wherein the fallback mode of communication allows communication between RF sites existing only at the first communication system. At step 907, and in response to the implementation of the fallback mode of communication, fallback core drops the first link through the cloud-based call-processing service.

It should be noted that the fallback core also replicates a first portion of a first database at the cloud-based call-processing service at a second database existing at the first RAN, wherein the first portion of the first database replicated at the second database comprises radio and talkgroup configuration and call activity information for only the first RAN, and is utilized to provide local communication within the first RAN when communication with the cloud-based call-processing service fails.

Figure 10:
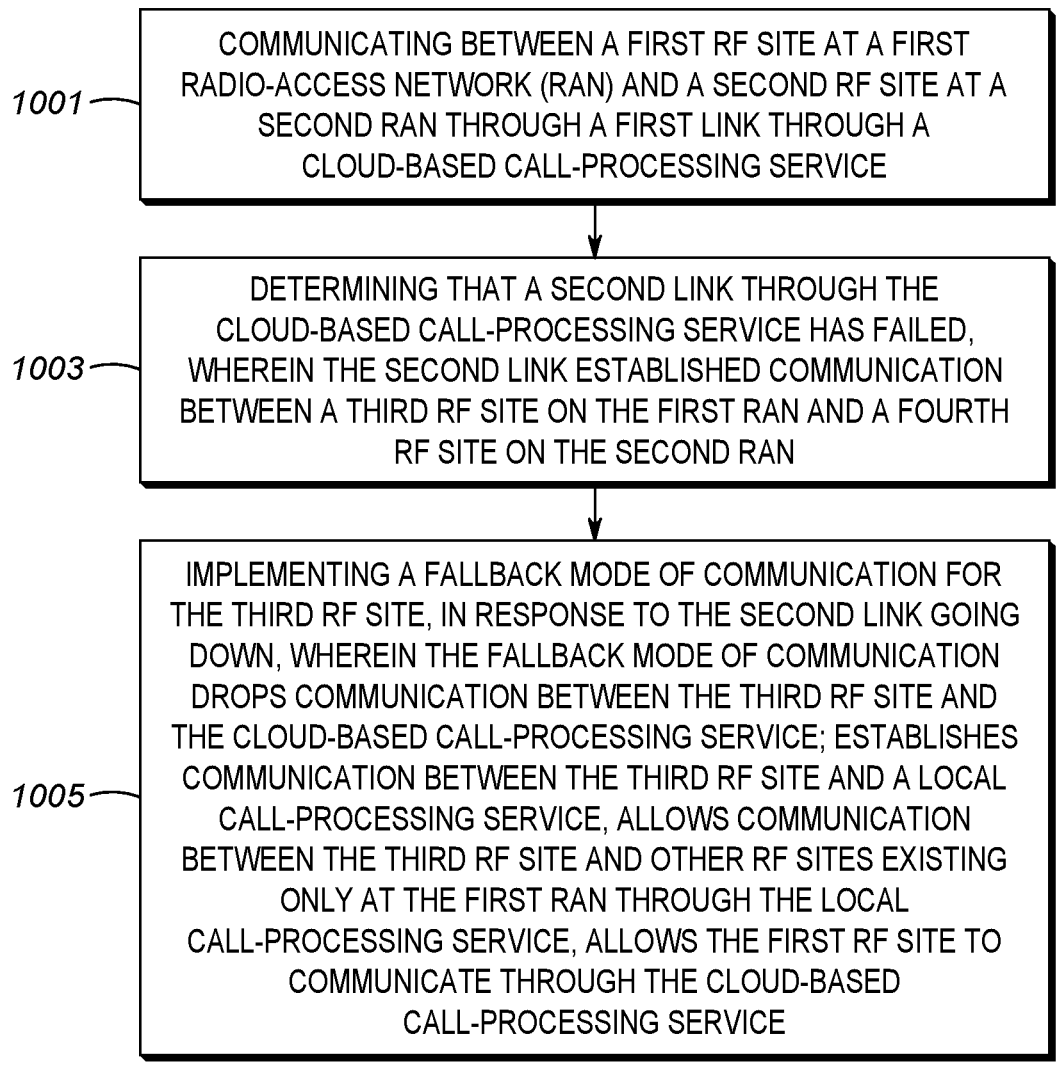
FIG. 10 is a flow chart showing a method for providing a fallback solution in a multi-tenant communication system.

FIG. 10 is a flow chart showing a method for providing a fallback solution in a multi-tenant communication system. At step 1001 communication takes place between a first RF site at a first radio-access network (RAN) and a second RF site at a second RAN through a first link through a cloud-based call-processing service. At step 1003 the fallback core determines that a second link through the cloud-based call-processing service has failed, wherein the second link established communication between a third RF site on the first RAN and a fourth RF site on the second RAN. At step 1005 the fallback core implements a fallback mode of communication for the third RF site, in response to the second link going down, wherein the fallback mode of communication drops communication between the third RF site and the cloud-based call-processing service, establishes communication between the third RF site and a local call-processing service, allows communication between the third RF site and other RF sites existing only at the first RAN through the local call-processing service; allows the first RF site to communicate through the cloud-based call-processing service.

In further embodiments of the present invention the fallback core may determine that a fifth RF site is within a same jurisdiction or county as the third RF site and implement a fallback mode of communication for the fifth RF site, in response to the second link going down based on the fact that the fifth RF site is within the same jurisdiction or county as the third RF site.

In yet a further embodiment of the present invention the fallback core may determine a history of communication between a fifth RF site and the third RF site and implement a fallback mode of communication for the fifth RF site, in response to the history of communication between the fifth RF site and the third RF site.

In yet a further embodiment of the present invention, the fallback core may determine that a predetermined number of links from the first RAN to the cloud-based call-processing service have failed and when a predetermined number of links have failed then the fallback mode of communication drops all communication between the all RF sites within the first RAN and the cloud-based call-processing service, establishes communication between all RF site within the first RAN and a local call-processing service, and allows communication between all RF sites within the first RAN through the local call-processing service.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method for providing a fallback solution in a multi-tenant communication system, the method comprising:
    communicating between a first RF site at a first radio-access network (RAN) and a second RF site at a second RAN through a first link established through a cloud-based call-processing service;
    determining that a second link through the cloud-based call-processing service has failed, wherein the second link established communication between a third RF site on the first RAN and a fourth RF site on the second RAN;
    implementing a fallback mode of communication for the first RAN, in response to the second link going down, wherein the fallback mode of communication allows communication between RF sites existing only at the first communication system;
    in response to the implementation of the fallback mode of communication, dropping the first link through the cloud-based call-processing service.
2. The method of claim 1 further comprising the step of:
    replicating a first portion of a first database at the cloud-based call-processing service at a second database existing at the first RAN, wherein the first portion of the first database replicated at the second database comprises radio and talkgroup configuration and call activity information for only the first RAN, and is utilized to provide local communication within the first RAN when communication with the cloud-based call-processing service fails.
3. A radio-access network (RAN) having a first RF site in communication with a second RF site at a second RAN through a first link established through a cloud-based call-processing service, the radio-access network comprising:
    a fallback core configured to:
        determine that a second link through the cloud-based call-processing service has failed, wherein the second link established communication between a third RF site on the first RAN and a fourth RF site on the second RAN;
        implement a fallback mode of communication for the first RAN, in response to the second link going down, wherein the fallback mode of communication allows communication between RF sites existing only at the first communication system; and
        in response to the implementation of the fallback mode of communication, drop the first link through the cloud-based call-processing service.
4. The radio-access network of claim 3 further comprising:
    a database comprising a replicated a first portion of a first database at a cloud-based call-processing service, wherein the database comprises radio and talkgroup configuration and call activity information for only the radio-access network and is utilized to provide local communication within the radio-access network when communication with the cloud-based call-processing service fails.
5. The RAN of claim 3 wherein the fallback core is further configured to:
    determine that a predetermined number of links from the first RAN to the cloud-based call-processing service have failed;

when a predetermined number of links have failed then the fallback mode of communication:
   drop all communication between the all RF sites within the first RAN and the cloud-based call-processing service;
   establish communication between all RF site within the first RAN and a local call-processing service;
   allow communication between all RF sites within the first RAN through the local call-processing service.

\* \* \* \* \*